May 24, 1927.  R. W. KEELER  1,629,666
TRANSMISSION CONTROL
Filed July 13, 1926  4 Sheets-Sheet 1
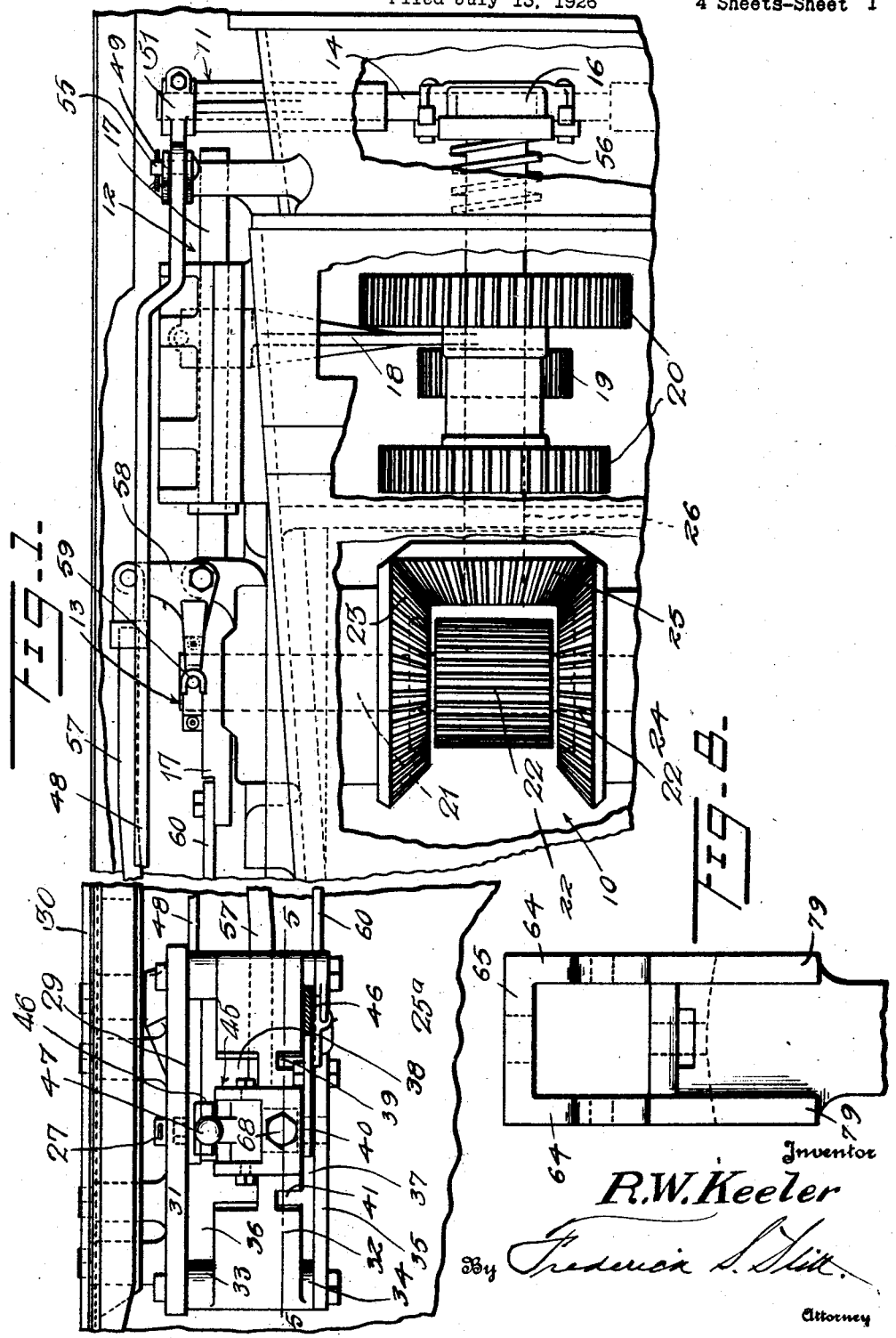
Inventor
R. W. Keeler
By Frederick S. Hitt.
Attorney

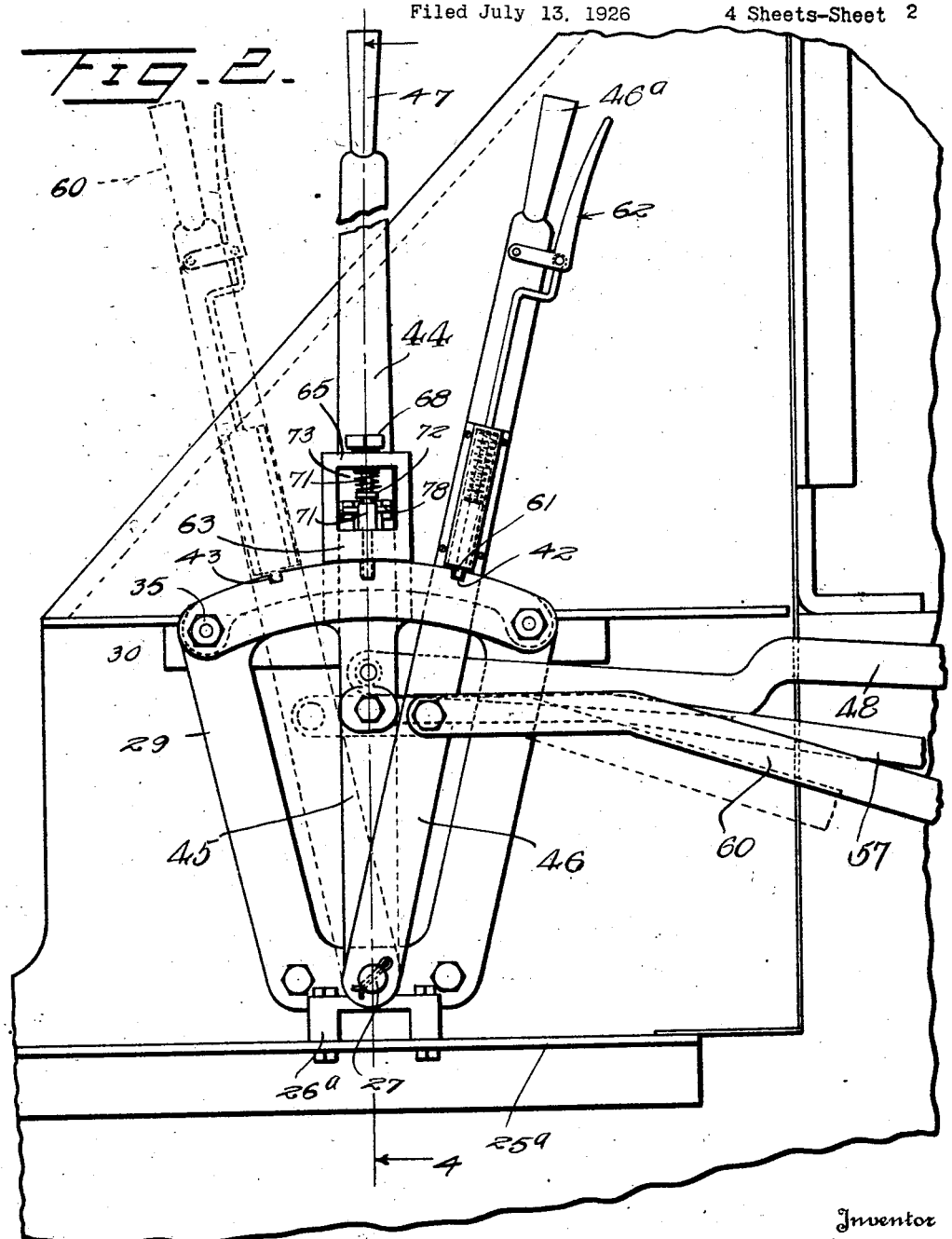

May 24, 1927.
R. W. KEELER
TRANSMISSION CONTROL
Filed July 13, 1926
1,629,666
4 Sheets-Sheet 3
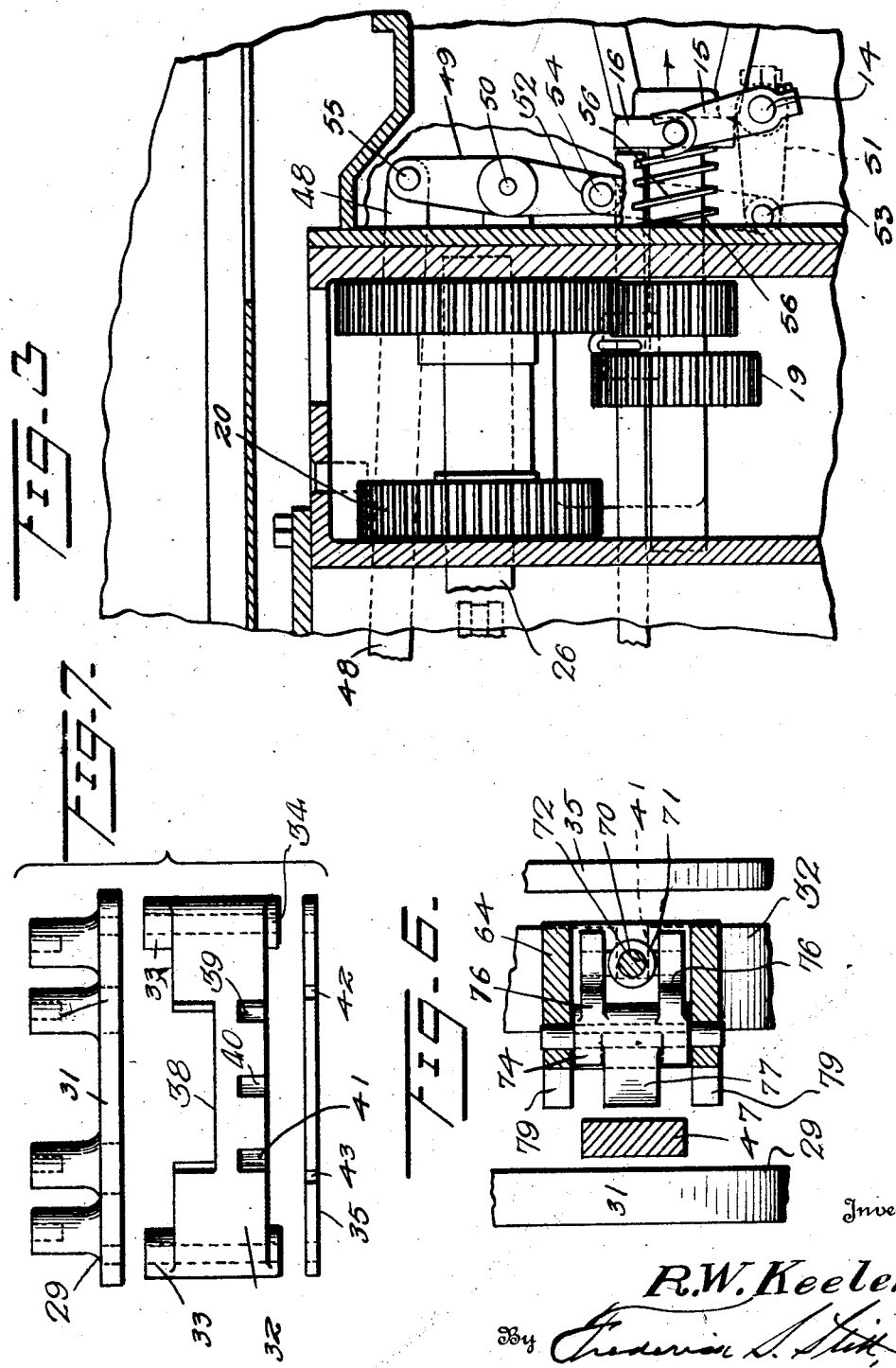
Inventor
R.W. Keeler
By Frederick L. Stix
Attorney

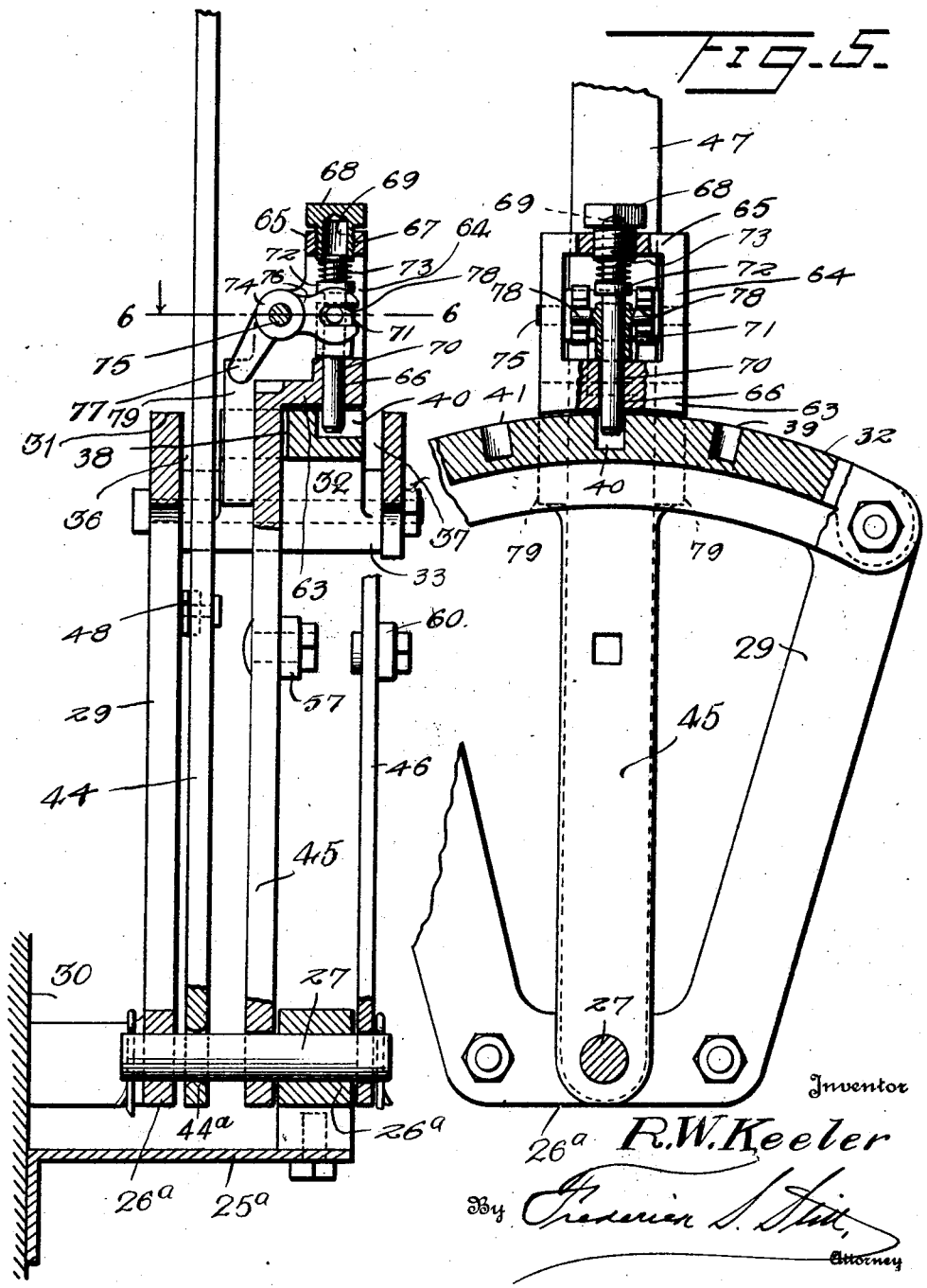

Patented May 24, 1927.

1,629,666

UNITED STATES PATENT OFFICE.

RAYMOND W. KEELER, OF GALION, OHIO, ASSIGNOR TO THE GALION IRON WORKS & MFG. CO., OF GALION, OHIO, A CORPORATION OF OHIO.

TRANSMISSION CONTROL.

Application filed July 13, 1926. Serial No. 122,259.

This invention relates to improvements in transmission controls and more particularly to a control for transmissions of heavy road rollers and the like.

The transmissions of road rollers are ordinarily equipped with three separate control elements operating to clutch the speed selection mechanism and the direction selection mechanism respectively. Therefore, in the ordinary transmission, if it is desired to change the direction of operation of the roller, it is necessary that the operator employ either both hands or a hand and a foot in the operation of the controls. With such heavy mechanisms, it is, of course, advisable that at all times, when any change of direction of operation of the roller is being made, that the clutch be disengaged, as otherwise the heavy roller, continuing in its movement, will cause considerable wear and tear upon the gears. Where the operation requires the use of both hands, or one hand and one foot of the operator, it is difficult to properly synchronize the movements of the levers and to insure proper disengagement of the clutch before the gears are shifted. It is accordingly an important object of the present invention to provide a construction wherein operation of the clutch and direction changing controls of the transmission are interlocked, so that no operation of the direction changing mechanism can take place until the clutch is properly disengaged.

A further and important object of the invention is to provide a device of this character wherein the clutch control, upon a predetermined operation thereof, unlocks a normally locked control for the direction changing mechanism, permitting the same to be moved from a neutral position to either of two positions, representing different directions of operation of the roller, the mounting of the clutch being such that the clutch control, after unlocking and shifting the direction control, is caused to engage the clutch sections by a continued movement thereof in the same direction.

A still further object of the invention is to provide a device of this character wherein the clutch is independently manipulatable when desired, so that the clutch may be disengaged without disturbing the direction controls when changing the speed of operation of the roller.

These and other objects I attain by the construction shown in the accompanying drawings, wherein for the purpose of illustration is shown a preferred embodiment of my invention and wherein:—

Figure 1 is a plan view partially broken away of a transmission and control mechanism therefor constructed in accordance with my invention;

Figure 2 is an enlarged side elevation of a control mechanism;

Figure 3 is an enlarged sectional view through a portion of the transmission showing the arrangement of the clutch control mechanism whereby movement of the clutch control lever to either side of a central point engages the clutch sections;

Figure 4 is a section on the line 4—4 of Figure 2;

Figure 5 is a section on the line 5—5 of Figure 1;

Figure 6 is a section on the line 6—6 of Figure 4;

Figure 7 is a combined plan of the sections of the control segment detached.

Figure 8 is an elevation of the upper end of one of the control levers employed.

Referring now more particularly to the drawings, the numeral 10 generally designates a transmission including a clutch operator 11, a speed selector 12 and a direction selector 13. In the present illustration, the clutch operator is illustrated as a rotatable shaft 14 having a shifting fork 15 for coaction with the movable member 16 of the clutch. The speed selector is shown as comprising the usual shaft 17 slidably directed through a casing and having thereon a fork 18 co-operating with a shiftable compound pinion unit 19 to engage the elements thereof with gears 20. The direction selector comprises a longitudinally shiftable shaft 21 having means 22 thereon for clutching the shaft to either of two gears 23 and 24 which are oppositely driven by a pinion 25 upon the output shaft 26 of the speed changing section of the transmission. It will, of course, be obvious that these portions of the mechanism are merely for the purpose of illustration and may consist of corresponding parts of any suitable transmission.

The numeral 25ª designates any suitable support, such as the deck of the tractor, and upon this support, I mount bearings or supports 26ª for a shaft 27. One of these supports is in the form of a plate 29 suitably secured to and spaced from the side wall 30 of the deck and the upper surface 31 of this plate is arcuately curved with the axis of the shaft 27 as a center. A similarly curved arcuate plate 32 is provided, this plate having at its ends at opposite side faces thereof protruding lugs 33 and 34. The lugs 33 abut the plate 29 while against the lugs 34 which are disposed at the outer face of the plate is secured a segment strap 35, the upper edge of which is arcuately curved to correspond to the curvature of the upper edges of the plates 29 and 32. The lugs 33 and 34 maintain the edges of the plate 32 in spaced relation to the plate 29 and bar 35 to thereby provide lever slots 36 and 37. The inner edge of the plate 32 is formed with a centrally located notch 38, while the upper edge thereof is formed with three notches 39, 40 and 41. The upper surface of the segment bar 35 is provided with two notches 42 and 43. Upon the shaft 27 are mounted three levers 44, 45 and 46. The lever 44 operates in the slot 36 between the plates 32 and 29, the lever 45 within the notch 38 of the plate 32 and the lever 46 within the slot 37 between the plate 32 and segment bar 35.

The lever 44 has a handle 47 and has connected thereto one end of a link 48 for controlling the clutch operator. The opposite end of this link is connected to one end of a lever 49 pivoted intermediate its ends upon a pivot 50 spaced above one end of the shaft 14. The shaft 14 has extending therefrom an arm 51, the end of which is connected with the opposite end of lever 49 by a link 52 pivoted to each thereof, as indicated at 53 and 54. It will be noted that in the central position of the lever 44, the pivotal connections 53 and 54 of the link 52 with the arm and the lever, the pivotal connection 50 of the lever and the pivotal connection 55 of the lever 49 with the link 48 are aligned. It, therefore, follows that if the lever 44 is shifted to either side of its central position, so that the alignment of these pivots is broken, the clutch spring 56 which constantly urges the movable member 16 and the clutch in the direction of the arrow of Figure 3, will tend to cause a continued movement of the lever in this direction. Thus, the sections of the clutch may be engaged with the lever at either end of its slot. The lever 45 has connected thereto one end of a link 57, the opposite end of which is connected with one arm of a bell crank lever 58, the other arm of which provides a shifting fork 59 for shifting the shaft 21 of the direction selecting mechanism 13. The lever 46 has connected thereto one end of a link 60, the opposite end of which is connected to the shaft 17 to provide a means for shifting the fork 18. This last named lever is provided with a handle 46ª and the latch 61 for engagement in the notches 42 and 43 of the segment bar. This latch is shown as provided with a conventional release mechanism 62 usually provided upon such a lever.

The lever 45 has no handle and has formed upon the upper end thereof an angularly directed head 63 which overlies the upper face of the plate 32. Arising from the sides of this head 63 are vertically extending flanges 64, the upper ends of which are connected by a cross bar 65. In the head 63 a vertical bore 66 is formed and the cross bar 65 has a threaded opening 67 axially alinged with this opening. Threaded in the opening 67 is a plunger cap 68 having a bore 69 receiving the upper end of a plunger 70, the lower end of which is slidably directed through the bore 66 of the head. This plunger is directed through a vertically extending sleeve 71 and above the upper end of the sleeve is a flanged shoulder 72. Between this flanged shoulder 72 and the plunger cap, a spring 73 surrounds the plunger and constantly urges the same downwardly. Between the flanges 64, a plunger trip lever 74 is mounted for oscillation upon a horizontal pivot 75. This trip lever embodies arms 76 and 77, the arm 76 being forked, to form members for engagement with lugs 78 formed upon opposite sides of the sleeve 71. The sleeve 71, by its engagement with the upper surface of the head 63, limits downward movement of the plunger and accordingly oscillatory movement of the trip lever in one direction. When the trip lever is in this position, the other arm 77 is projected beyond the inner face of the lever and between the flanges 79 extending inwardly from this inner face. These flanges have their adjacent faces spaced apart a distance such that the lever 44 may be extended therebetween to engage the arm 77 of the trip lever and thereby elevate the arm 76 thereof and plunger 70. The plunger 70, when in its lowermost position, engages in one of the three notches 39, 40 and 41 formed on the outer edge of the plate 32.

In operation, when the lever 45 has the plunger thereof engaged in the notch 40 of the plate 32, the direction selector is in intermediate or neutral position and there is no transmission of drive from the outward shaft 26 of the speed change mechanism to the output shaft or shafts of the transmission, not shown. Accordingly, at this time, the speed selection can be made without any danger whatever of damage to the gears of the speed changing mechanism. A speed having been selected, the next operation is to shift the lever 44 through its handle 47 from the end of the slot 36 at which it happens to be located to the center thereof, so that it aligns with the space between the flanges 79 upon the inner face of the lever 45. This movement of the lever 44 to central position disconnects the clutch. The lever 44, the pivot 44ª of which is such as to permit oscillation thereof longitudinally of the axis of the shaft 27 as well as its rotation upon the shaft, is then swung in against the face of the lever 45. As it moves toward the face of the lever 45, it engages against the arm 77 of the trip lever, moving this arm inwardly and elevating the arms 76 and with them the plunger 70, so that the lever 45 is freed for movement. Maintaining the engagement between the levers 45 and 44, the lever 44 is now shifted to align this plunger with either of the notches 39 or 41, as may be desired. When the plunger is properly aligned with the notch, the handle 47 of the lever 44 may be released. The spring 73 will then act to urge the plunger 70 and sleeve 71 downwardly, with the result that the arm 77 of the trip lever 74 moves inwardly, forcing the lever 44 from between the flanges 79. As the pivots 50, 53, 54, and 55 are now no longer aligned, the spring 56 is acting to urge the lever 44 to that end of the slot 36 toward which it has been moved, with the result that the lever will automatically shift to this end of the slot, permitting the clutch sections to engage and placing the roller in operation. If, during operation, selection of a higher speed is desired, the clutch lever 44 may be moved to the central position without disturbing the lever 45 and the lever 46 shifted to its new position.

It will, of course, be obvious that the various connections employed must necessarily be slightly altered in adapting them to different types of transmissions. Other changes being possible without in any manner departing from the spirit of the invention, I do not limit myself to the specific structure hereinbefore set forth except as hereinafter claimed.

I claim:—

1. In combination with a transmission mechanism including a clutch and directions selection mechanism having "forward," "reverse" and "neutral" positions, an operating control lever for the direction selection mechanism having a latch whereby it is locked against movement in each of the positions of the direction selection mechanism and a control lever for said clutch alignable with the first named control lever in any of the positions of said direction selection mechanism and when aligned therewith disengaging the sections of the clutch, said clutch control lever being operable to release the latch of the control member and when positioned to release the latch of the control member having engagement with the control member whereby the control member shifts therewith.

2. In combination with a vehicle transmission including a clutch having a movable member spring-urged to clutch engaging position and a direction control mechanism having "forward," "reverse" and "neutral" positions, a control lever for the clutch connections between the control lever and movable member of the clutch whereby the movable member is disengaged when the control lever is at or adjacent the center of its travel and is engaged when the lever is at either limit of its travel, a control lever for the direction control mechanism, connections between the direction control mechanism and the last named control lever whereby the control lever is at the center of its travel when the direction control mechanism is in "neutral" and a latch for the last named control lever engageable and releasable by a predetermined operation of the first named control lever when the first named control lever is aligned with the last named control lever and the clutch sections are disengaged to thereby permit the last named control lever to move with the first named control lever.

3. In combination with a vehicle transmission including a clutch having a movable member spring-urged to clutch engaging position and a direction control mechanism having "forward", "reverse" and "neutral" positions, a control lever for the clutch connections between the control lever and movable member of the clutch whereby the movable member is disengaged when the control lever is at or adjacent the center of its travel and is engaged when the lever is at either limit of its travel, a control lever for the direction control mechanism, connections between the direction control mechanism and the last named control lever whereby the control lever is at the center of its travel when the direction control mechanism is in "neutral" and a latch for the last named control lever engageable and releasable by a predetermined operation of the first named control lever when the first named control lever is aligned with the last named control lever and the clutch sections are disengaged to thereby permit the last named control lever to move with the first named control lever, the first and last named control levers having engagement with one another whereby the last named control lever is moved with the first named lever while the first named control lever is in latch disengaging position.

4. In combination with a vehicle transmission including a clutch having a movable member spring-urged to clutch engaging position and a direction control mechanism having "forward", "reverse" and "neutral" positions, a control lever for the clutch connections between the control lever and movable member of the clutch whereby the movable member is disengaged when the control lever is at or adjacent the center of its travel and is engaged when the lever is at either limit of its travel, a control lever for the direction control mechanism, connections between the direction control mechanism and the last named control lever whereby the control lever is at the center of its travel when the direction control mechanism is in "neutral" and a latch for the last named control lever engageable and releasable by a predetermined operation of the first named control lever when the first named control lever is aligned with the last named control lever and the clutch sections are disengaged to thereby permit the last named control lever to move with the first named control lever, the first and last named control levers having engagement with one another whereby the last named control lever is moved with the first named lever while the first named control lever is in latch disengaging position, the connections between the movable member of the clutch and the control lever therefor applying the pressure of the spring to move the control lever to either limit of its travel when the control lever is initially moved toward either limit from its central position.

5. In combination with a vehicle transmission including a clutch having a movable member spring-urged to clutch engaging position and a direction control mechanism having "forward", "reverse" and "neutral" positions, a control lever for the clutch connections between the control lever and movable member of the clutch whereby the movable member is disengaged when the control lever is at or adjacent the center of its travel and is engaged when the lever is at either limit of its travel, a control lever for the direction control mechanism, connections between the direction control mechanism and the last named control lever whereby the control lever is at the center of its travel when the direction control mechanism is in "neutral" and a latch for the last named control lever engageable and releasable by a predetermined operation of the first named control lever when the first named control lever is aligned with the last named control lever and the clutch sections are disengaged to thereby permit the last named control lever to move with the first named control lever, the first and last named control levers having engagement with one another whereby the last named control lever is moved with the first named lever while the first named control lever is in latch disengaging position, the connections between the movable member of the clutch and the control lever therefor applying the pressure of the spring to move the control lever to either limit of its travel when the control lever is initially moved toward either limit from its central position, the latch operating mechanism including a part acting to disengage the first and last named control levers whereby release of the handle of the clutch control lever, after an operation thereof to move the direction control lever to either "reverse" or "forward" positions, causes disengagment of the control levers and permits application of the spring pressure of the movable member of the clutch to shift the clutch control lever to the adjacent limit of its travel.

6. In combination, two control levers, one lever having a latch whereby it is held against movement in any of a plurality of positions, gearing controlled by said lever, a clutch controlled by the other lever, said other lever having a "neutral" position and a clutch engaging position and maintaining the sections of the clutch disengaged during the travel of the last named lever corresponding to the travel of the first named lever, a spring urging the last named lever to clutch engaging position when the lever is primarily shifted from its "neutral" position toward its clutch engaging position, the last named lever having coacting with the first named lever whereby a predetermined operation thereof disengages the latch of the first named lever and engages said levers with one another to thereby permit movement of the first named lever by the last named lever.

7. In combination, two control levers, one lever having a latch whereby it is held against movement in any of a plurality of positions, gearing controlled by said lever, a clutch controlled by the other lever, said other lever having a "neutral" position and a clutch engaging position and maintaining the sections of the clutch disengaged during the travel of the last named lever corresponding to the travel of the first named lever, a spring urging the last named lever to clutch engaging position when the lever is primarily shifted from its "neutral" position toward its clutch engaging position, the last named lever having coaction with the first named lever whereby a predetermined operation thereof disengages the latch of the first named lever and engages said levers with one another to thereby permit movement of the first named lever by the last named lever, the connections between the last named lever and the latch whereby the latch is disengaged acting to terminate engagement of the levers when the first named lever is released to thereby permit said spring to urge the last named lever to clutch engaging position.

8. In combination with a transmission mechanism including a clutch and direction selection mechanism having "forward", "reverse" and "neutral" positions, an operating control lever for the direction selection mechanism having a latch whereby it is locked against movement in each of the positions of the direction selection mechanism and a control lever for said clutch alignable with the first named control member in any of the positions of said direction selection mechanism and when aligned therewith disengaging the sections of the clutch, said clutch control lever being operable to release the latch of the control member and when positioned to release the latch of the control member having engagement with the control member whereby the control member shifts therewith, the connections between the clutch control lever and the latch of the control member including a part terminating engagement of said levers when the clutch control lever is released.

9. In combination with a transmission mechanism including a clutch and direction selection mechanism having "forward", "reverse and "neutral" positions, an operating control lever for the direction selection mechanism having a latch whereby it is locked against movement in each of the positions of the direction selection mechanism, a control lever for said clutch alignable with the first named control member in any of the positions of said direction selection mechanism and when aligned therewith disengaging the sections of the clutch, said clutch control lever being operable to release the latch of the control member and when positioned to release the latch of the control member having engagement with the control member whereby the control member shifts therewith, the connections between the clutch control lever and the latch of the control member including a part terminating engagement of said levers when the clutch control lever is released and a spring urging the clutch control lever to the clutch engaging position when disengaged from the control member.

10. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism and a control lever for said clutch alignable with the first named control member in any of the positions of said direction selection mechanism and when aligned therewith disengaging the sections of the clutch, said clutch control lever being operable to release the latch of the control member, the control member having spaced flanges between which the clutch lever engages when positioned to release the latch.

11. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism, a control lever for said clutch alignable with the first named control member in any of the positions of said direction selection mechanism and when aligned therewith disengaging the sections of the clutch, said clutch control lever being operable to release the latch of the control member, the control member having spaced flanges between which the clutch lever engages when positioned to release the latch, said latch being spring-urged to its latching position and a bell crank lever pivoted upon the control lever having one arm thereof operatively engaged with the latch and the other arm thereof normally disposed between said flanges and in the path of the clutch lever.

12. In combination with a lever pivoted to swing in a given plane, a second lever adjacent the first named lever and swingable in a plane parallel to the first named lever and movable toward and away from the first named lever, the first named lever having means providing opposed walls between which the last named lever is engageable to thereby permit the first named lever to be moved by the last named lever, a latch for the first named lever and a control member for the latch including a part projecting between said walls and engaged by the last named lever as it is moved between said walls and thereby shift to release the latch.

13. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism and a control lever for the clutch operable to release the latch of the first named control lever in any of the positions thereof.

14. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism and a control lever for the clutch operable to release the latch of the first named control lever in any of the positions thereof and when positioned to release the latch of the control member having engagement with the control member whereby the control member shifts therewith.

15. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism and a control lever for the clutch operable to release the latch of the first named control lever in any of the positions thereof and when positioned to release the latch disengaging the sections of the clutch.

16. In combination with a transmission mechanism including a clutch and direction selection mechanism having "forward," "reverse" and "neutral" positions, an operating control lever for the direction selection mechanism having a latch whereby it is locked against movement in each of the positions of the direction selection mechanism and a control lever for the clutch operable to release the latch of the first named control lever in any of the positions thereof and when positioned to release the latch disengaging the sections of the clutch and when positioned to release the latch of the control member having engagement with the control member whereby the control member shifts therewith.

In testimony whereof I affix my signature.

RAYMOND W. KEELER.